United States Patent [19]

Hune

[11] Patent Number: 4,931,249
[45] Date of Patent: Jun. 5, 1990

[54] APPARATUS AND PROCESS FOR MIXING AND DISPENSING HIGH VISCOSITY, MULTIPLE COMPONENT REACTIVE LIQUIDS INTO A MOLD

[75] Inventor: Ronald G. Hune, Sugarland, Tex.
[73] Assignee: Thermal Designs, Inc., Houston, Tex.
[21] Appl. No.: 334,751
[22] Filed: Apr. 3, 1989

Related U.S. Application Data

[63] Continuation of Ser. No. 40,877, Apr. 20, 1987, abandoned.

[51] Int. Cl.⁵ .............. B29C 41/20; B29C 45/13; B67D 5/60
[52] U.S. Cl. .............. 264/279.1; 264/328.6; 425/130; 425/145; 425/543; 222/134; 222/136; 222/137; 222/138
[58] Field of Search ............ 264/275, 401, 40.4, 264/40.7, 279.1, 328.6; 425/130, 91, 145, 147, 192 R, 543; 222/134, 136, 137, 138

[56] References Cited

U.S. PATENT DOCUMENTS

| | | | |
|---|---|---|---|
| 2,601,018 | 6/1952 | Heyl et al. | 366/339 |
| 2,788,953 | 4/1957 | Schneider | 366/132 |
| 3,081,909 | 3/1963 | Hooker | 222/134 |
| 3,097,764 | 7/1963 | Loeser | 222/134 |
| 3,702,747 | 11/1972 | Porter et al. | 425/130 |
| 3,853,446 | 12/1974 | Hostettler | 264/328.6 |
| 3,924,989 | 12/1975 | Althausen et al. | 425/130 |
| 3,973,889 | 8/1976 | Richman | 425/130 |
| 4,030,637 | 6/1977 | Boden | 425/130 |
| 4,037,758 | 7/1977 | Bourque | 222/134 |
| 4,170,319 | 10/1979 | Suh et al. | 222/134 |
| 4,199,303 | 4/1980 | Gusmer et al. | 425/130 |
| 4,269,798 | 5/1981 | Ives | 264/245 |
| 4,307,760 | 12/1981 | Hauser | 264/40.1 |
| 4,413,683 | 11/1963 | Hune | 169/48 |
| 4,571,319 | 2/1986 | Baluch et al. | 264/40.1 |
| 4,592,885 | 6/1986 | Ichino | 425/131.1 |

FOREIGN PATENT DOCUMENTS 1197090 11/1959 France ................. 100/45

OTHER PUBLICATIONS

Novo ®, "Metering and Mixing Systems", Brochure 100, Series Spiral Mixer Brochure.
Gearchem Pump Brochure.
Geariron Pump Brochure.

Primary Examiner—Jay H. Woo
Assistant Examiner—Jeremiah F. Dirkin, II
Attorney, Agent, or Firm—Dodge, Bush & Moseley

[57] ABSTRACT

An apparatus and process are provided for mixing and dispensing high viscosity, multiple component reactive liquids into a mold. The apparatus and process are particularly suitable for mixing and dispensing highly viscous intumescent fireproofing materials. Each reactive liquid component is stored in a separate pressure tank. The liquid components flow through separate conduits leading from each pressure tank, and are metered by a gear pump located in each component conduit. A gear linkage synchronously links the gear pumps together, and a self-locking motor is adapted to drive the linked gear pumps. When the motor is turned off, the gear pumps act as a valve to stop flow of the component liquids. The metered components flow into a common conduit, which has therein a static mixer for thoroughly mixing the components. The mixed components are then dispensed through an orifice. This orifice can be directed to the bottom of the mold so that the mold can be filled with the highly viscous material from the bottom to reduce the formation of air voids.

3 Claims, 2 Drawing Sheets

APPARATUS AND PROCESS FOR MIXING AND DISPENSING HIGH VISCOSITY, MULTIPLE COMPONENT REACTIVE LIQUIDS INTO A MOLD

This application is a continuation, of application Ser. No. 040,877, filed 4/20/87 now abandoned.

BACKGROUND OF THE INVENTION

1. Field of the Invention

This invention relates generally to a novel apparatus and process for mixing and dispensing high viscosity, multiple component, reactive liquids, and more particularly, to a novel apparatus and process useful in molding a high viscosity, multiple component, reactive fireproofing material onto the surface of equipment, such as electric valve actuators.

2. Prior Art

In petroleum refineries and petrochemical plants, there exist enormous amounts of flammable products being stored, pumped, and processed. These flammable products represent a very great fire hazard to all equipment where such flammable products might be present. The release of flammable products in a refinery or chemical plant can result in enormous fire damage to the plant if such flammable material is ignited. The release of flammable material can result from the failure of a mechanical seal on a pump, the rupture of piping, the failure or leaking of a process valve, or a large number of other possible causes.

One of the primary methods in preventing large fires and in stopping them once they have started is to control the release of flammable product into the area where the fire is burning. The prevention or control of such a fire depends greatly upon cesstion of the flow of flammable product before serious and irreversible damage can be done. Once the flammable product is no longer available, the fire can be easily extinguished.

In order to stop the flow of flammable products under such circumstances, many refineries and chemical plants provide isolation or block valves to shut off the flow of flammable product so that the fire can be easily extinguished. These isolation or block valves are often remote-controlled motor operated valves. In terms of sensitivity of fire, it is usually the case that the valve actuators and related control equipment are more troublesome than are the valves themselves. Typically, the valves themselves used in this environment have heavy steel castings and machined parts so that they are not affected by a fire to the extent that they require protection themselves. Heat sensitive equipment in these emergency shutdown systems include valve actuators, junction boxes, disconnect switches, and wiring conduit and conduit fittings.

As an example of heat sensitive equipment, actuators of the electromechanical type usually include soft metal, plastic parts, and sensitive electrical components that require protection from fire so that the actuator can be relied upon to activate the valve when needed, even when the valve itself is directly in the fire. Typical of the type of electromachanical valve actuator used in this environment are those sold under the Series 2000 designation by E.I.M. Company, Inc. of Missouri City, Tex.

One solution to protecting equipment such as valve actuators and junction boxes under extremely high temperature conditions is shown in U.S. Pat. No. 4,413,683, which discloses a fireproof enclosure made of a ceramic fiber material in a vacuum molding process. The fireproof enclosure is placed around the actuator to be protected. Such enclosures, however, do not permit easy access to the enclosed equipment for routine maintenance. Further, in some cases, there may not be adequate room to mount such enclosures.

Wiring conduit and conduit fittings have been protected using a ceramic fiber blanket wrapped around the conduit. Molded calcium silicate pieces have also been placed over conduit for fire protection. These methods, however, require significant labor in the plant for installation.

More recently, an alternative system has been developed for protecting emergency shutdown equipment in extreme high temperature conditions which involves the application of an intumescent fireproofing material directly to the equipment to be protected. One such intumescent coating material is sold by Avco Corporation, Lowell, Mass. under the trademark CHARTEK®, including two grades, a more viscous grade designated 59 and another grade designated 59-C. CHARTEK® intumescent fireproofing is supplied as a two component system, a liquid resin and a liquid hardener. Both components are highly viscous. For the CHARTEK® 59-C grade of fireproofing, for example, the resin has a viscosity of about 58,000 centipoise at about 115° F. and the hardener has a viscosity of about 4300 centipoise as measured on the Brookfield scale. According to the information known to applicant, CHARTEK is a two component polyamide cured, epoxy coating including a resin filled with encapsulated micadust, fibrous glass and bisphenol (a Diglycidyl Ether). The hardener contains flame retardant chemicals such as triethylene tetramine and diethylene triamine.

The resulting fireproofing material has a viscosity of about 20,000 centipoise. CHARTEK® fireproofing material has been used by spray applying the mixed components to the surface of the object to be protected, such as structural steel members used in various industrial applications.

Initially, the process of using intumescent fireproofing on equipment such as valve actuators, junction boxes, breaker boxes, conduits, etc., involved hand mixing the components and hand applying the material to the outer surface of the equipment. For adequate protection of the equipment, CHARTEK® 59 fireproofing material is hand applied to a thickness of about one-half inch over the equipment surface. This thickness is recommended by Avco Corporation to meet the fireproofing specifications of the major oil companies. In testing, the hand-applied CHARTEK® 59 intumescent coating protected valve actuators in fire conditions of over 2000° F. such that the interior of the actuators experienced temperature rises in the range of about 72°–110° F. over an exposure period of 25 minutes. Major oil company specifications require a temperature rise of 200° F. maximum for a 20 minute exposure to fire conditions.

However, this manual process of applying the fireproofing material has two drawbacks. First, hand mixing the two components can introduce voids into the fireproofing material, which reduces the fireproofing effectiveness of the coating on the equipment, and the components may be inadequately mixed or mixed at an improper ratio. Second, applying the material by hand to equipment is labor intensive and results in a somewhat unattractive product. Smooth, even surfaces are difficult to achieve in a hand application method.

It has been found that an attractive intumescent coating fireproofed product can be achieved by molding the CHARTEK ® 59-C fireproofing material onto a piece of equipment or component parts of a piece of equipment. This can be accomplished by producing a mold that follows the general contours of the part while allowing a one-half inch thickness of fireproofing to be cast around the part, placing the part in the mold with a one-half inch space between the mold and the part, and introducing the fireproofing material into the space between the mold and the part. Simple equipment, such as conduits, can be molded completely in a single mold. For more complex equipment, such as valve actuators, component parts are not detrimental to the protection of the equipment because the intumescent fireproofing material intumesces or expands to 3 to 4 times its original size when exposed to flame, covering up any seams.

However, because of the shape and size of the pieces of equipment to be coated, it is extremely difficult to introduce the fireproofing material into the mold and assure that the mold is properly filled without air voids. Introducing the material from the top of the mold by hand may generate air voids, because CHARTEK ® 59-C intumescent fireproofing in such a highly viscous material. It is desirable to introduce the viscous intumescent coating at the bottom of the mold to minimize the development of air voids.

Equipment exists for the mixing and dispensing of reactive components. However, none of these existing systems are suitable for mixing and dispensing the highly viscous intumescent fireproofing material discussed here. One system used in molding boots is shown in U.S. Pat. No. 4,037,758 to Bourque, in which components such as a prepolymer and a curative are delivered by positive displacement pumps through a special valve, through a static mixing tube, and out a dispensing valve. However, the complexity of the material flow path and flow restrictions in this system are inappropriate for handling the high viscosity materials contemplated by the present invention. It appears that the special valve incorporated into this system with its elastic diaphragms could not operate on a highly viscous material such as CHARTEK ® 59-C fireproofing. Nor does it appear that this system could provide sufficient pressure to such highly viscous materials before the material enters the positive displacement pumps used in the system.

U.S. Pat. No. 4,1701,319 to Suh et al. shows a system in which two liquid components are stored in accumulators at preselected pressures and are supplied to a mixing device through mechanically linked positive displacement pumps. The patent mentions materials having viscosities in the range from 10–1000 centipoise. It appears that this system would not be capable of handling materials having viscosities in the range of 4300 centipoise or 58,000 centipoise. Particularly, it does not appear that the bladders in the accumulators used in this system could handle such highly viscous materials.

Systems are commercially available and used for separately mixing and then spray applying CHARTEK ® 59 fireproofing material. However, these spray systems develop extremely high pressures in the material by use of piston type positive displacement pumps, making them inappropriate for use in dispensing the fireproofing material into a mold.

SUMMARY OF THE INVENTION

In accordance with the present invention, a novel apparatus and process are provided for mixing and dispensing high viscosity, multiple component, reactive liquids that substantially overcome the disadvantages of the prior art.

In accordance with one embodiment of the present invention, an apparatus is provided for mixing and dispensing a highly viscous, multiple component, reactive liquid to a mold. The apparatus has a separate pressure tank for storing and pressurizing each liquid component and a dispensing orifice. A separate component conduit communicates with each pressure tank, and a common liquid conduit communicates between both component conduits and the dispensing orifice. A separate gear motor pump is located in each of the component conduits, and these are synchronously linked by a gear linkage. The apparatus also includes means engaging the linked gear motor pumps for driving and stopping them, and a static mixer located in the common liquid conduit.

In another embodiment, the pressure tanks pressurize the liquid components to a pressure in the range of about 75–250 psi.

In a further embodiment, the driving and stopping means of the apparatus is a self locking, worm drive motor.

In still another embodiment of the invention, the static mixer is a static mixing tube.

In still a further embodiment of the apparatus, each pressurized tank has a conical bottom wall.

In yet another embodiment, the common liquid conduit of the apparatus includes a flexible conduit.

According to another aspect of the invention, a process is provided for molding a highly viscous, multiple component, reactive liquid fireproofing material onto an object. The process includes the steps of first separately storing each viscous liquid component and pressurizing each stored viscous liquid component. Each pressurized liquid component is then flowed through a separate conduit to a separate metering gear motor pump, and each liquid component is metered through the respective gear motor pump and into a common conduit to converge and combine the metered liquid components into a fireproofing material. A mold is formed around an object to be fireproofed, and the fireproofing material is dispensed from the common conduit into the space between the mold and the object. The flow of fireproofing material is stopped when the molding process is completed by stopping the gear motor pump.

In another embodiment of the process of the invention, the fireproofing material is dispensed into the bottom of the mold.

An advantage of the apparatus of the present invention is that it mixes and delivers in a smooth continuous stream a highly viscous material to a mold.

Another advantage is that the apparatus has a minimum of moving parts in the flow stream of the viscous material. By minimizing moving parts in the flow stream, maintenance problems are minimized.

A further advantage of this invention is that a low cost, uncomplicated apparatus is provided for mixing and dispensing highly viscous materials in a smooth continuous stream.

Still another advantage of the present invention is that the apparatus accurately meters two component liquid materials.

A still further advantage of this invention is that an apparatus and a process are provided to dispense a highly viscous liquid material into a mold a the bottom of the mold to minimize formation of air voids in the material.

Yet another advantage of this invention is that a viscous, intumescent fireproofing material, particularly CHARTEK ® 59-C fireproofing, is accurately mixed and dispensed into a mold. This permits molding of intumescent fireproofing onto various pieces of equipment, such as valve actuators.

DETAILED DESCRIPTION OF THE PREFERRED EMBODIMENTS

Figure 1:
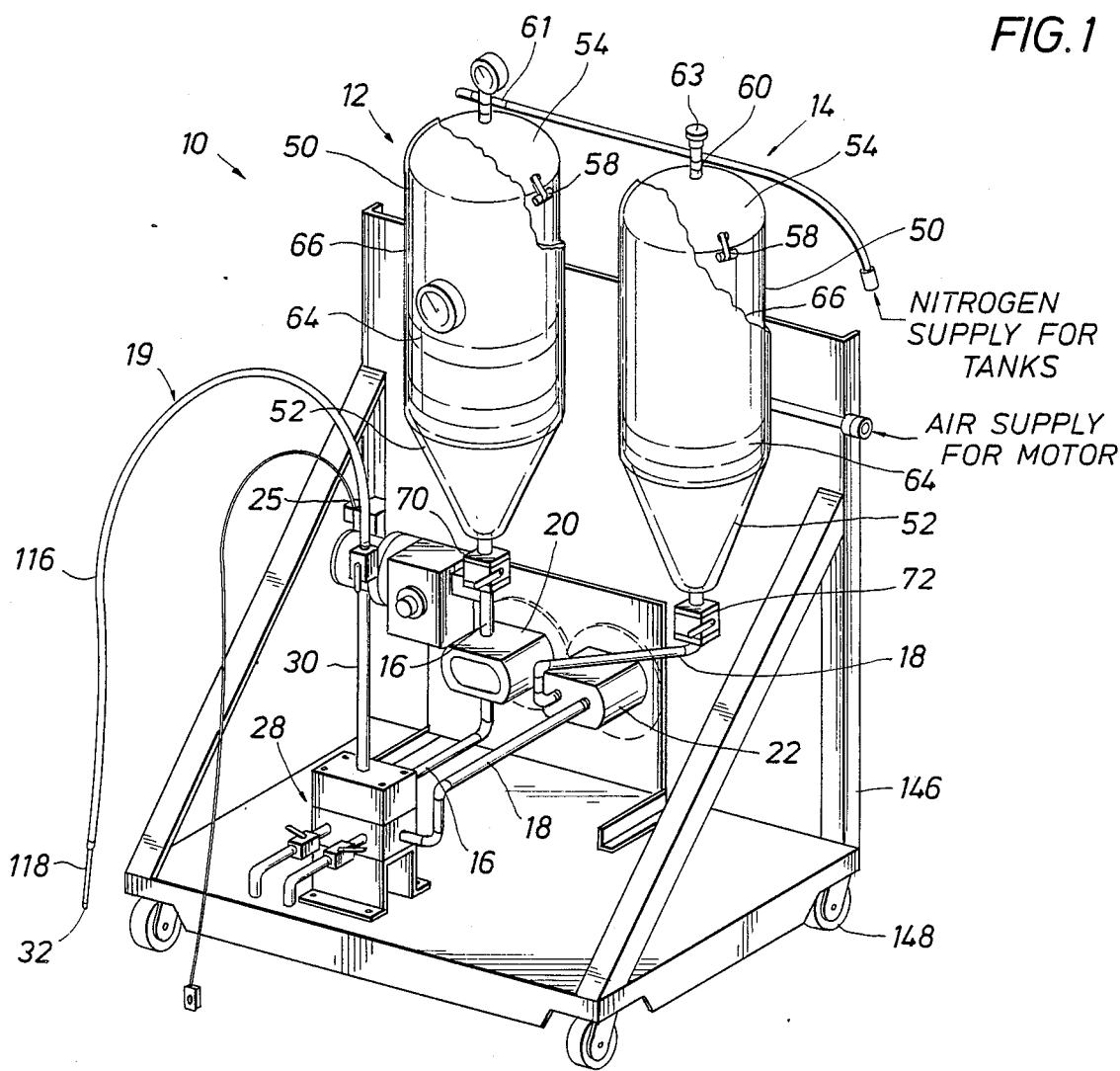
FIG. 1 is an overall perspective view of an apparatus in accordance with the present invention.
Figure 2:
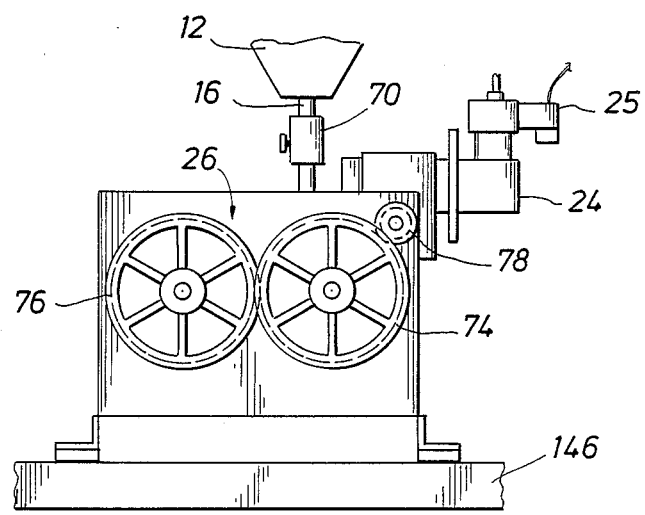
FIG. 2 is a rear view of a portion of the apparatus shown in FIG. 1 showing the gear pump driving mechanism.

Referring first to FIGS. 1 and 2, there is shown an apparatus 10 useful in mixing and dispensing highly viscous, two component reactive liquids. Apparatus 10 is particularly suitable for mixing and dispensing CHARTEK ® 59-C fireproofing material, available from Avco Corporation, Lowell, Mass., into molds for molding the material onto equipment of component parts of equipment, such as valve actuators. The description that follows discusses apparatus 10 in context of its use with CHARTEK ® 59-C fireproofing material. However, apparatus 10 is useful in the mixing and dispensing of materials having a mixed viscosity of about 5000–30,000 centipoise and in which no individual component has a viscosity less than about 1000 centipoise as measured on the Brookfield scale.

Apparatus 10 includes a pressure storage tank 12 for pressurizing and storing the resin component of the fireproofing material, and a pressure storage tank 14 for pressurizing and storing the hardener component. A resin conduit 16 and a hardener tank 14, respectively. A common liquid conduit 19 communicates between both component conduits 16, 18 and a dispensing orifice 32. A resin gear motor pump 20 and a hardener gear motor pump 22 are located in conduits 16, 18, respectively. The gear motor pumps are synchronously linked together by a gear linkage 26. A driving and stopping means 24 engages gear motor pumps 20, 22 to drive them and prevent them from rotating. A static mixer 30 is located in common conduit 19 to mix the resin and hardener components.

Preferably means 24 is a self-locking, worm drive air motor. When air motor 24 is turned off, the drive mechanism is locked in place, preventing gear motor pumps 20, 22 from rotating. Also preferably, conduits 16, 18 communicate with common conduit 19 in a mixing block 28.

Referring in more detail to pressure tanks 12, 14, each pressure tank has cylindrical sidewalls 50 and a conical bottom wall 52, which facilitates flow of the resin and hardener materials from the tanks into conduits 16, 18. Each tank also has a hinged lid 54 that sealingly engages the sidewalls 50 so that tanks 12, 14 can be pressurized. A suitable lid 54 is one sold under the name Camlock by Tube Turns Corporation, Houston, Tex. Lid 54 has a plurality of cam actuated locking mechanisms 58 for securing lid 54 to sidewalls 50 so that tanks 12, 14 can be pressurized. An O-ring (not shown) seals between lid 54 and sidewalls 50. Lids 54 are provided with couplings 60, 61 which accept a line from a nitrogen source (not shown) for pressurizing tanks 12, 14 to equal pressure, and these couplings have check valves so that the nitrogen source can be disconnected without losing tank pressure. Coupling 61 also accepts a pressure gauge 62 so that tank pressure can be monitored. Coupling 60 has a bleed off valve 63.

Tank 12 is sized larger than tank 14 as shown in FIG. 1. Preferably, the volumetric ratio of tank 12 to tank 14 roughly approximates the required ratio of component materials. For CHARTEK ® 59-C fireproofing, the required ratio of resin to hardener is about 63:37.

The CHARTEK ® 59-C fireproofing material manufacturer recommends that the resin and hardener components be heated for proper mixing. Accordingly, pressure tanks 12, 14 are each provided with strip heaters 64. The larger tank 12 is preferably provided with two such heaters. An example of an appropriate heater is a flexible silicon heater, Model T-20, available from Watlow Electric Co., Winona, Minn. These strip heaters can be cemented onto each tank with a silicone adhesive, and they have thermostats to regulate the temperature. Based on the CHARTEK ® 59-C fireproofing manufacturer's recommendation, the resin component should be maintained at a temperature of about 115° F., and the hardener component at a temperature of about 95° F.

To better control the tank temperature, each tank is preferably insulated with insulation 66. Because the temperature of the resin component is more critical, resin storage tank 12 is preferably insulated with a one-inch thick fiberglass mat covered with silicon coated glass cloth and laced into place. Hardener storage tank 14 may be insulated with two layers of $\frac{1}{8}$th inch ceramic fiber paper.

Storage tanks 12, 14 must be pressurized because of the extremely high viscosity of the CHARTEK ® 59-C fireproofing resin and hardener components. Gear motor pumps 20, 22 alone are inadequate to pump these viscous components through apparatus 10. Preferably, tanks 12, 14 can be pressurized so that with motor 24 disengaged from gear motor pumps 20, 22, the components would be pushed through the system and out orifice 32 without any input from the gear pumps. Pressure tanks 12, 14 are rated to a maximum pressure of about 300 psi and have steel walls one-half inch thick.

Resin conduit 16 and hardener conduit 18 extend from the bottom of storage tanks 12, 14, respectively. To assure unrestricted flow of the viscous resin and hardener components, conduits 16, 18 are 1¼ inch diameter copper tubing. Because the resin component is over ten times more viscous than the hardener component, conduits 16, 18 are configured to extend between tanks 12, 14 and mixing block 28 so that resin conduit 16 is substantially shorter than hardener conduit 18. The shorter length of conduit 16 reduces the frictional resistance encountered by the resin component as it flows from tank 12 to mixing block As shown in FIGS. 1 and 2, full flow valves 70, 72 may be located below storage tanks 12, 14, respectively. By closing valves 70, 72 the system downstream of the valves can be disconnected and cleaned without depressurizing tanks 12, 14. In normal operation of apparatus 10, however, valves 70, 72 remain open and provide a full ¼ inch diameter, unrestricted flow path for the resin and hardener components. An example of a suitable valve that meets these requirements is a ball valve, Model No. S/S 67TF20-LD, manufactured by Whitey Company, Highland Heights, Ohio.

Gear motor pumps 20, 22 are connected by a gear linkage 26 that includes two gears 74, 76 externally mounted on gear motor pumps 20, 22. Air motor 24 drives gear motor pumps 20, 22 through a gear 78 engaged with gear 74. Gear motor pumps 20, 22 are bi-rotational. Accordingly, when drive gear 78 turns gear 74 in one direction (for example, in the clockwise direction), drive gear 76 is driven in the opposite direction (for example, in the counterclockwise direction). Of course, the gear motor pumps to which drive gears 74, 76 are attached correspondingly turn in opposite directions. An example of an appropriate air motor for use in apparatus 10 is Dayton brand Model 7Z604 having an infinite speed control, manufactured by Dayton Electric Manufacturing Co., Chicago, Ill.

Primarily, air motor 24 drives gear motor pumps 20, 22 to meter the resin and hardener components, respectively, and the gear motor pumps act as motors rather than as pumps. Additionally, gear motor pumps 20, 22 can be driven by air motor 24 to act as pumps and boost the pressure of the resin and hardener components from the pressure supplied by tanks 12, 14. The combined pressure supplied by pressurized tanks 12, 14 and gear motor pumps 20, 22 assures an adequate rate of flow of the fireproofing material from orifice 32. Flow rate can easily be increased or decreased by increasing or decreasing the air motor speed.

During normal operation, gear motor pumps 20, 22 operate at a speed of about 120 rpm, up to a maximum of about 250 rpm. Speeds approaching 500 rmp may generate too much heat in the highly viscous component materials being metered through gear motor pumps 20, 22, which may undesirably cause gases to be given off of the component materials.

As previously stated, air motor 24 is self-locking. That is, when the air motor is turned off by solenoid switch 25, its worm gear drive mechanism is locked. Thus, when air motor 24 is turned off, gear 78 cannot rotate, and gears 74, 76 prevent gear motor pumps 20, 22 from rotating. Through this arrangement, gear motor pumps 20, 22 are used in apparatus 10 as valves to turn on and turn off the flow of the resin and hardener components through apparatus 10 to orifice 32. By simply switching off air motor 24, fireproofing material stops flowing through apparatus 10. This provides a system much simplified from prior art systems by eliminating additional vavles that are usually required to control the flow of material through mixing and dispensing equipment.

Gear motor pumps 20, 22 must have clearance between their impellers and casings large enough so that hydraulic lock does not occur between impellers and casings, but small enough to prevent slippage of the resin and hardener components through the pumps when air motor 24 is turned off and pumps 20, 22 are stopped. Liquid components with lower viscosities, for example, 1000 centipoise or lower, will tend to leak through (slipppage) the stationary impeller and casing in gear motor pumps 20, 22. Thus, for lower viscosity materials, gear motor pumps 20, 22 do not effectively act as valves. Slippage through the gear pumps will cause inaccurate ratios of less viscous liquid components to arrive at the common conduit 19.

For CHARTEK® 59-C fireproofing material (an example of a highly viscous material), however, the resin and hardener components are so highly viscous that the components do not leak through the clearance between the stationary impellers and casings of gear motor pumps 20, 22. Thus, gear motor pumps 20, 22 effectively shut off the flow of the highly viscous component materials.

The proper ratio of resin to hardener is maintained in apparatus 10 by selecting a resin gear motor pump 20 and a hardener gear motor pump 22 having volume per revolution capacities in the same ratio as the required volume ratio of the components. By using equally sized gears 74, 76, gear motor pump 20 rotates once for each rotation of gear motor pump 22. Gear motor pumps 20, 22 then accurately meter the correct ratio of resin to hardener.

An example of appropriate gear motor pumps for use in apparatus 10 are Model 2015 and Model 2025, manufactured by Hydreco, Kalamazoo, Mich. These are bi-rotational gear motor pumps with shaft seals rated at 1000 psi. Model 2025, used in apparatus 10 as gear motor pump 20, has theoretical volume of 5.197 cubic inches per revolution. Model 2015, used in apparatus 10 for gear motor pump 22, has a theoretical volume of 3.115 cubic inches per revolution. These gear motor pumps are large enough so that they can be operated at speeds in the desired range of about 120 rpm up to about 250 rpm maximum. With these gear motor pumps and air motor 24, flow rates can be varied up to several gallons per minute. To install gear motor pump 22 in 1¼ inch diameter conduit 18, the conduit is bushed down to connect into the one inch ports on the gear motor pump.

Figure 4:
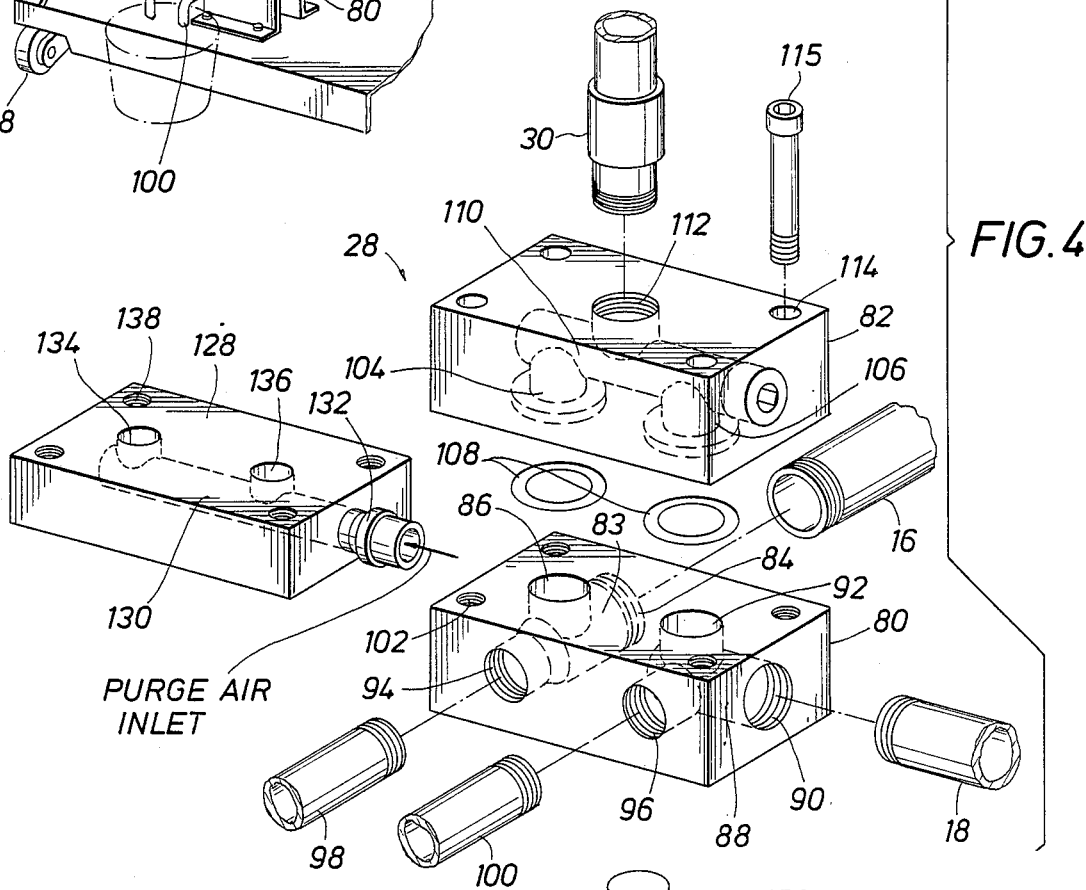
FIG. 4 is an exploded perspective view of the mixing block of the apparatus.

Mixing block 28 will now be described. Referring to FIG. 4, mixing block 28 includes a discharge manifold 80 and a mixing manifold 82. Discharge manifold 80 has a resin passage 83 with an inlet 84 tapped to receive resin conduit 16 and an outlet 86. Discharge manifold 80 has a resin passage 83 with an inlet 84 tapped to receive resin conduit 16 and an outlet 86. Discharge manifold 80 also has a hardener passage 88 with an inlet 90 tapped to received hardener conduit 18 and an outlet 92. Discharge manifold 80 further has a resin bleed-off passage 94 that communicates with resin passage 83, and a hardener bleed-off passage 96 that communicates with hardener passage 88. Bleed-off passages 94, 96 are tapped to receive faucets 98, 100, the purpose of which will be explained hereinafter. Finally, discharge manifold 80 has a plurality of tapped apertures 102.

Mixing manifold 82 has a resin inlet passage 104 that communicates with outlet 86 and a hardener inlet passage 106 that communicates with outlet 92. O-rings 108 are positioned in a recess at the interface between inlet passage 104 and outlet 86 and between inlet passage 106 and outlet 92 to prevent leakage of the resin and hardener components. A central passage 110 communicates with inlet passages 104, 106, and a tapped common outlet passage 112, the beginning of common conduit 19, leads from central passage 110. A plurality of holes 114 are provided through mixing manifold 82 so that it can be bolted to discharge manifold 80 by threading bolts 115 into tapped apertures 102 in the discharge manifold.

Mixer 30 is preferably a static mixing tube, which has no moving parts that could fail in handling the highly viscous materials intended to be mixed in apparatus 10. Static mixing tube 30 is threaded into the tapped common outlet passage 112 in mixing manifold 82. An example of an appropriate static mixing tube for use in apparatus 10 is a Series 100 mixing tube having a TEFLON ® (TEFLON is a trademark for synthetic fluroine containing resins used espcially for coatings to prevent sticking) coated stainless steel mixing element, available from TAH Industries, Inc., Imlaystown, N.J. To assure adequate mixing of the resin and hardener components of the CHARTEK ® 59-C fireproofing material, two such mixing tubes can be coupled together. For example, a 9 TM inch long tube and an 18 TM inch long tube are used in apparatus 10 to provide a sufficient mixing length to achieve adequate mixing of the components.

Common conduit 19 includes a flexible conduit 116 between mixer 30 and orifice 32 so that orifice 32 can easily be moved from one dispensing point to another. For example, when one mold had been filled with fireproofing material, orifice 32 can easily be moved to another mold by means of the flexible hose. An example of a suitable flexible hose 116 for use in apparatus 10 is a TEFLON ® tube stainless steel braid hose 6 feet long and having a ¾ inch inside diameter available from Titeflex Corp., Springfield, Mass. From mixing block 28 through mixer 30, flexible hose 116, and wand 118 to orifice 32, there is a pressure drop of about 150 psi.

Because the CHARTEK ® 59-C fireproofing material is extremely viscous, it is desirable to direct the material into the bottom of a mold to minimize development of air voids in the fireproofing material as it is dispensed into the mold. To this end, a discharge wand 118 may be included in common conduit 19 connected to flexible conduit 116. Dishcarge wand 118 can more easily be inserted into the tight space between a mold and the object on which the fireproofing material is being molded.

Figure 3:
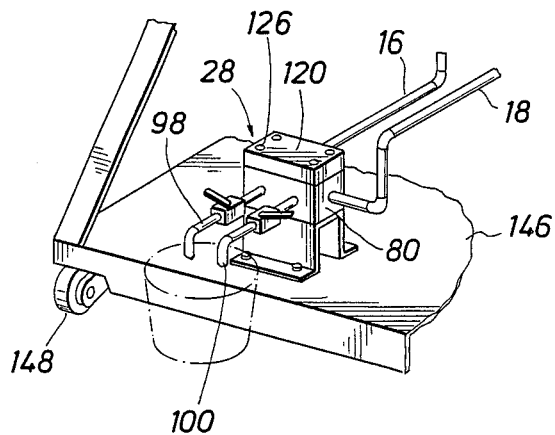
FIG. 3 is a perspective view of a portion of the apparatus shown in FIG. 1.

Preferably, mixing block 28 is adapted to tap off unmixed resin and hardener components for use is small applications and to assure that the components are flowing through apparatus 10 without air voids before beginning operation of apparatus 10. As shown in FIG. 3, to tap off the unmixed components, mixing manifold 82 is unbolted and replaced by a discharge manifold cover plate 120. Cover plate 120 has a pair of apertures (not shown) that match resin and hardener outlets 86, 92 in discharge manifold 80. O-rings 108 shown in FIG. 4 provide a seal between these apertures and outlet 86 and outlet 92. A plurality of holes 126 in cover plate 120 accept bolts to bolt cover plate 120 to discharge manifold 80. With cover plate 120 in place, the resin and hardener components are directed to faucets 98, 100.

It is also preferable that mixing block 28 is adapted for purging mixing manifold 82 and everything downstream thereof. As shown in FIG. 4, mixing manifold 82 is unbolted from discharge manifold 80, and a purge cover plate 128 is bolted to the mixing manifold. Purge cover plate 128 has a central passage 130 with an inlet 132 for accepting an air supply fitting. Purge cover plate 128 also has a resin outlet 134 that communicates between central passage 130 and resin inlet passage 104 in mixing manifold 82, and a hardener outlet 136 that communicates with hardener inlet passage 106 in mixing manifold 82. A plurality of tapped apertures 138 accept bolts for bolting purge cover plate 128 to mixing manifold 82. By first connecting an air supply and then a steam supply to inlet 132, mixing manifold 82, mixer 30, flexible hose 116, and discharge wand 118 can be purged of the fireproofing material, which has a limited pot life.

As shown in FIG. 1, apparatus 10 is mounted on a steel platform 146 with casters 148. This permits apparatus 10 to be moved from one location to another for easy access to different mold locations.

OPERATION OF APPARATUS AND DESCRIPTION OF MOLDING PROCESS

The process of molding CHARTEK ® 59-C fireproofing material onto an object such as a valve actuator and use of apparauts 10 in the process are now described.

A mold is constructed from a pattern which allows a thickness of fireproofing to be cast around all metal surfaces of the equipment or component part thereof to be fireproofed. A suitable thickness of the CHARTES ® 59-C fireproofing to meet industry fireproofing standards is about ½ inch. For simple shapes, the mold may be plastic, but for more complex shapes, glass fiber reinforced molds are preferred. The inner surface of a fiberglass mold is highly waxed and polished and a mold release agent applied to both plastic and fiberglass molds so that the mold is more easily released after the fireproofing has cured.

The metal surfaces of the object to be fireproofed are commercially blasted and primed with an epoxy primer to a thickness of about 2 mils. For large surfaces on the object to be coated, Avco Corporation recommends that a metal mesh be attached to the surface to assist in holding the fireproofing onto the surface. A suitable mesh is a one-half inch, 18 gage, galvanized wire open mesh, commonly called hardware cloth. This can be attached by wrapping around cylindrical surfaces, for example. The object is the placed in the mold.

Resin and hardener are placed in storage tanks 12, 14, respectively. Both tanks are pressurized to a pressure in the range of about 75 to 250 psi, which provides sufficient pressure to pump the resin and hardener through apparatus 10. The tanks are heated so that the components reach the temperature specified by the manufacture for proper mixing.

Valve 70, 72 are open so that the resin and hardener components flow through conduit 16, 18 to gear motor pumps 20, 22. As previously described, with air motor 24 turned off, the resin and hardener cannot flow past gear motor pumps 20, 22.

To begin the molding process, air motor 24 is turned on, and gear motor pumps 20, 22 meter the resin and hardener components through conduits 16, 18 in the proper proportions. When the resin component reaches mixing block 28, it flows through resing passage 83, resin inlet passage 104, and into central passage 100. Likewise, the hardener component flows through hardener passage 88, hardener inlet passage 106 and into central passage 110. The resin and hardener components combine as they flow from central passage 110 out through common outlet passage 112. They then flow through static mixer 30, where the two components are thoroughly mixed, then through flexible hose 116 and out orifice 32. If discharge wand 118 is attached, the wand can be extended down into the bottom of the mold so that the mold is filled with fireproofing material from the bottom to the top, thereby reducing the possibility of air voids forming in the fireproofing. When the mold is filled, air motor 24 is switched off, which stops the flow of fireproofing material. Orifice 32 can then be moved to another mold to repeat the process.

Wand 118 is suitable for filling open faced molds from the bottom to the top. If a particular mold does not permit insertion of wand 118, the mold may be provided with a port near the bottom of the mold. Dispensing orifice 32 can be inserted in such a fill port, and fireproofing material can then be injected into the mold from the bottom of the top with air being pushed clear through risers at the top of the mold.

After a mold has been filled with fireproofing material, the mold is left in place for at least about 6 to 12 hours before the mold is removed.

Depending on the size of the mold, it may be desirable to increase the flow rate of fireproofing material from dispensing orifice 32. That is, for larger molds, it may be desirable to increase the rate of flow of the fireproofing material. This can be easily accomplished by increasing the speed of air motor 24, which increases the speed of the impellers of gear pumps 20, 22.

Figure 5:
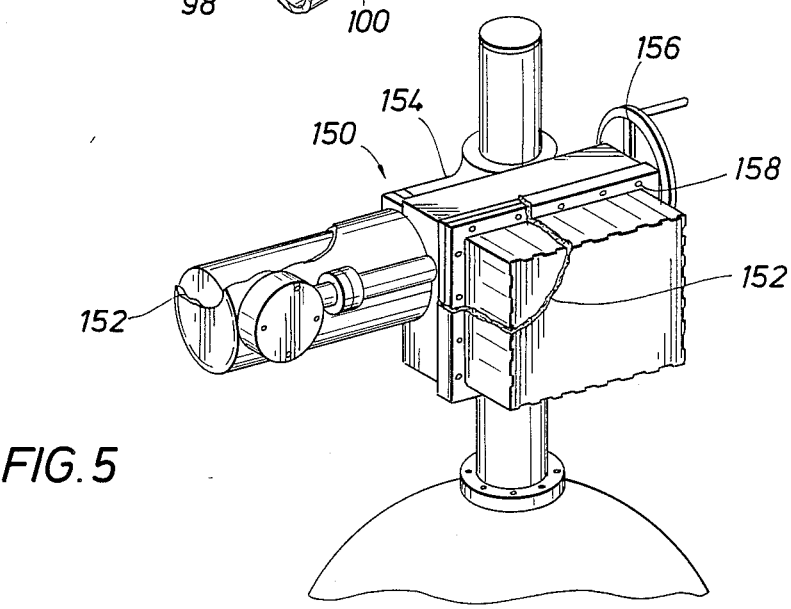
FIG. 5 is perspective view in partial section of a valve actuator that has been coated with intumescent fireproofing.

A valve actuator 150 coated at component parts 152 with molded CHARTEK® 59-C intumescent fireproofing is shown in FIG. 5. For other component parts, such as at 154, CHARTEK® 59 fireproofing may be hand applied, although it is preferable that as much of the actuator as possible be molded. It may be appreciated that seams 156 are formed when the fireproofing is molded to individual actuator components. Also, access points, such as bolts 158, are not covered by fireproofing. However, this is not detrimental to actuator 150 because when exposed to flame, the intumescent coating expands to 3 to 4 times its original size, covering all seams and access points. Thus, the equipment is protected while allowing access to all maintenance points.

The foregoing description has been directed to particular embodiments of the invention in accordance with the requirements of the Patent Statute for the purposes of illustration and explanation. It will be apparent, however, to those skilled in this art that many modifications and changes in the apparatus and process set forth will be possible without departing from the scope and spirit of the invention. It is intended that the following claims be interpreted to embrace all such modifications and changes.

What is claimed is:

1. Apparatus for combining and dispensing a resin and a hardener in a predetermined volumetric proportion to form a fireproofing compound for application to a mold about a device to be fireproofed comprising,
    a first tank containing a resin in a semi-liquid state of extremely high viscosity,
    a second tank containing a hardener in a semi-liquid state of high viscosity,
    a first gear pump means communicating with said first tank through a resin conduit having a first output capacity per revolution for metering said resin from said first tank to a first conduit,
    a second gear pump means communicating with said second tank through a hardener conduit having a second output capacity per revolution for metering said hardener from said second tank to a second conduit,
    means for turning said first and second pump means including
        a motor having an output shaft about which a drive gear is mounted,
        first and second equally sized gears secured respectively to said first and second gear pump means, said first and second gears being engaged with one of said first and second gears,
        said gear pumps being bi-rotational, whereby said drive gear turns said one of said first and second gears in a first direction with the other of said first and second gears turning in a second direction,
    mixing means for accepting said metered resin and said metered hardener from said first and second conduits for mixing said resin and hardener to form a fireproofing compound, and
    flexible conduit means connected to said mixing means for transporting said fireproofing compound from said mixing means to said mold.

2. Apparatus of claim 1 wherein
    said first conduit from said gear pump means connected to said mixing means is of shorter length than said second conduit from said second gear pump means connected to said mixing means, whereby said resin of extremely high viscosity encounters less frictional resistance in said first conduit than does said hardener in said second conduit.

3. A method for fireproofing an object comprising the steps of
    applying pressurized resin in a semi-liquid state of extremely high viscosity of about 58,000 centipoise at about 115° F. to a first metering gear pump,
    applying pressurized hardener in a semi-liquid state of high viscosity of about 4300 centipoise as measured on the Brookfield scale to a second metering gear pump,
    turning said first and second gear pumps for metering said resin to a first conduit and for metering said hardener to a second conduit, controlling the flow of said pressurized resin and said pressurized hardener respectively to said first conduit and to said second conduit by stopping the turning of said first and second gear pumps wherein said first and second metering gear pumps when not turning act, in combination respectively with said resin of extremely high viscosity and said hardener of high viscosity as cut off valves,
    applying said resin in said first conduit and said hardener in said second conduit directly to a mixer to form an intumescent fireproofing compound of about 20,000 centipoise on the Brookfield scale, and
    applying said intumescent fireproofing compound to a mold formed about said object to be fireproofed.

* * * * *